(12) United States Patent
Tamagawa

(10) Patent No.: US 6,452,151 B1
(45) Date of Patent: Sep. 17, 2002

(54) IMAGE-SENSING SEMICONDUCTOR DEVICE AND IMAGE-SENSING DEVICE

(75) Inventor: Toshimitsu Tamagawa, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 70 days.

(21) Appl. No.: 09/625,722

(22) Filed: Jul. 26, 2000

(30) Foreign Application Priority Data

| Jul. 27, 1999 | (JP) | ............................................. 11-211611 |
| Sep. 3, 1999 | (JP) | ............................................. 11-249527 |
| Oct. 21, 1999 | (JP) | ............................................. 11-299057 |
| Nov. 22, 1999 | (JP) | ............................................. 11-331493 |

(51) Int. Cl.$^7$ ........................................... H01L 27/146
(52) U.S. Cl. ..................... 250/208.1; 348/241; 348/245
(58) Field of Search ....................... 250/208.1; 348/241, 348/242, 257, 245

(56) References Cited

U.S. PATENT DOCUMENTS

| 5,097,338 | A | * | 3/1992 | Kuriyama et al. | ........... 358/482 |
| 5,268,765 | A | * | 12/1993 | Yamashita | ................... 348/245 |
| 6,291,810 | B1 | * | 9/2001 | Yokomichi et al. | ....... 250/208.1 |

* cited by examiner

Primary Examiner—Robert H. Kim
Assistant Examiner—Glen Kao
(74) Attorney, Agent, or Firm—Arent, Fox, Kintner, Plotkin & Kahn, PLLC

(57) ABSTRACT

An image-sensing semiconductor device has, in addition to a plurality of photodiodes, a dummy photodiode. The dummy photodiode is fed with a bias repeatedly with a predetermined period, and the plurality of photodiodes are fed with a bias sequentially with a predetermined cycle. The differences between the individual output signals of the plurality of photodiodes and the output signal of the dummy photodiode are calculated sequentially by a differential amplifier.

12 Claims, 16 Drawing Sheets

IMAGE-SENSING SEMICONDUCTOR DEVICE AND IMAGE-SENSING DEVICE

BACKGROUND OF THE INVENTION

1. Field of the Invention

The present invention relates to an image-sensing semiconductor device and to an image-sensing device.

2. Description of the Prior Art

An image-sensing device used to read an original image has a plurality of image-sensing semiconductor devices (semiconductor chips) arranged therein, of which each has a plurality of photodiodes (photoelectric conversion devices) arranged in a row. As shown in FIG. 18, each semiconductor chip has a photodiodes D1, D2, . . . , Dn, amplifying transistors A1, A2, . . . , An, constant-current sources I1, I2, . . . , In, and switching transistors C1, C2, . . . , Cn. As pulses are fed in sequentially at terminals O1, O2, . . . , On, the transistors C1, C2, . . . , Cn are turned on sequentially, so that the photoelectric conversion signals from the photodiodes D1, D2, . . . , Dn are delivered to an output terminal 100.

However, the photodiodes have variations in characteristics inevitable in their manufacture from one chip to another, and therefore the photoelectric conversion signals output therefrom include errors due to variations from one chip to another. On the other hand, as shown in FIG. 20, the switching transistors C1, C2, . . . , Cn each have parasitic capacitances 101 and 102 between their gate G and source S and between their gate G and drain D. Accordingly, a switching voltage fed in via the terminal O and applied to the gate G affects, through those capacitances 101 and 102, the voltages at the source S and drain D.

For example, the switching transistor C2 of the second pixel is turned on at a time point P2 in FIG. 19 and, at this time, as the switching voltage drops, the voltage at its drain (and thus the output voltage of the photodiode D2) drops. However, at this time point P2, the switching transistor C1 of the first pixel is turned off, and therefore the rising voltage at its gate appears at its drain and thereby raises the voltage on the output line 105.

This means that the effect of the dropping voltage of the switching signal for the switching transistor C2 is canceled by the effect of the rising voltage of the switching signal for the switching transistor C1. Similarly, also with the third and following pixels, the effect of the switching voltage therefor is canceled by the switching voltage for the previous stage, and thus does not appear at the output terminal 100.

However, with the first pixel, at the time point P1 when the switching signal for the switching transistor C1 drops, no voltage is present that acts to cancel the effect of this dropping voltage. As a result, with the first pixel, it is conventionally inevitable that such a dropping voltage is mixed with and output together with the desired signal.

SUMMARY OF THE INVENTION

An object of the present invention is to provide an image-sensing semiconductor device and an image-sensing device employing such an image-sensing semiconductor device that permit individual chips to output photoelectric conversion signals free from errors due to variations in characteristics among the chips.

Another object of the present invention is to provide an image-sensing semiconductor device and an image-sensing device employing such an image-sensing semiconductor device that eliminate the effect of a switching signal on the photoelectric conversion signal from the first pixel within a chip.

To achieve the above objects, according to one aspect of the present invention, an image-sensing semiconductor device is provided with: a plurality of image-sensing photodiodes; a dummy photodiode; first bias means for feeding a bias to the dummy photodiode repeatedly with a predetermined period; second bias means for feeding a bias to the plurality of photodiodes sequentially with a predetermined cycle; means for feeding the output signals of the plurality of photodiodes sequentially to a first input terminal of a differential amplifier; means for feeding the output signal of the dummy photodiode to a second input terminal of the differential amplifier; and output means for feeding the output of the differential amplifier to an output terminal.

This image-sensing semiconductor device may be further provided with means for eliminating a direct-current component from the output of the differential amplifier and means for superimposing a new direct-current voltage on the output of the differential amplifier after elimination of the original direct-current component therefrom. This helps avoid the effects of offsetting resulting from amplification or other.

Alternatively, the image-sensing semiconductor device may be further provided with an output switch through which the output from the differential amplifier passes before reaching the output terminal, output control means for keeping the output switch in a conducting state until the output signals from all of the photodiodes have passed therethrough, and means for generating, in accordance with a clock, pulses to be used to feed the output signals of the photodiodes to the differential amplifier. In this case, the output control means produces a passage control signal from the clock and has delay means for extending the passage control signal. This helps avoid malfunctioning resulting from a delay along the signal path (i.e. malfunctioning in which the switch is closed before the photoelectric conversion signal is output from the last photodiode).

By forming this image-sensing semiconductor device on a single chip, it is possible to form an image-sensing device having a plurality of semiconductor chips arranged so as to form a line, with the semiconductor chips each having a plurality of image-sensing photoelectric conversion devices arranged in a row. In this case, a dummy photoelectric conversion device is provided in each of the semiconductor chips, and, from one semiconductor chip after another, a photoelectric conversion signal is output that represents the differences between the output of the dummy photoelectric conversion device and the individual outputs of the image-sensing photoelectric conversion devices.

According to another aspect of the present invention, an image-sensing semiconductor device is provided with: a plurality of image-sensing photodiodes; a dummy photodiode; first bias means for feeding a bias to the dummy photodiode repeatedly with a predetermined period; second bias means for feeding a bias to the plurality of image-sensing photodiodes sequentially with a predetermined cycle; a plurality of switching transistors for feeding the output signals of the plurality of image-sensing photodiodes sequentially to a first input terminal of a differential amplifier; means for feeding the output signal of the dummy photodiode to a second input terminal of the differential amplifier; and a dummy switching transistor having an input terminal connected so as to receive the output signal of the dummy photodiode, having an output electrode connected to the first input terminal of the differential amplifier, and controlled by a switching voltage applied to a control electrode thereof in such a way as to be turned off substantially simultaneously when the switching transistor corresponding to the first of the image-sensing photodiodes is turned on.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Figure 1:
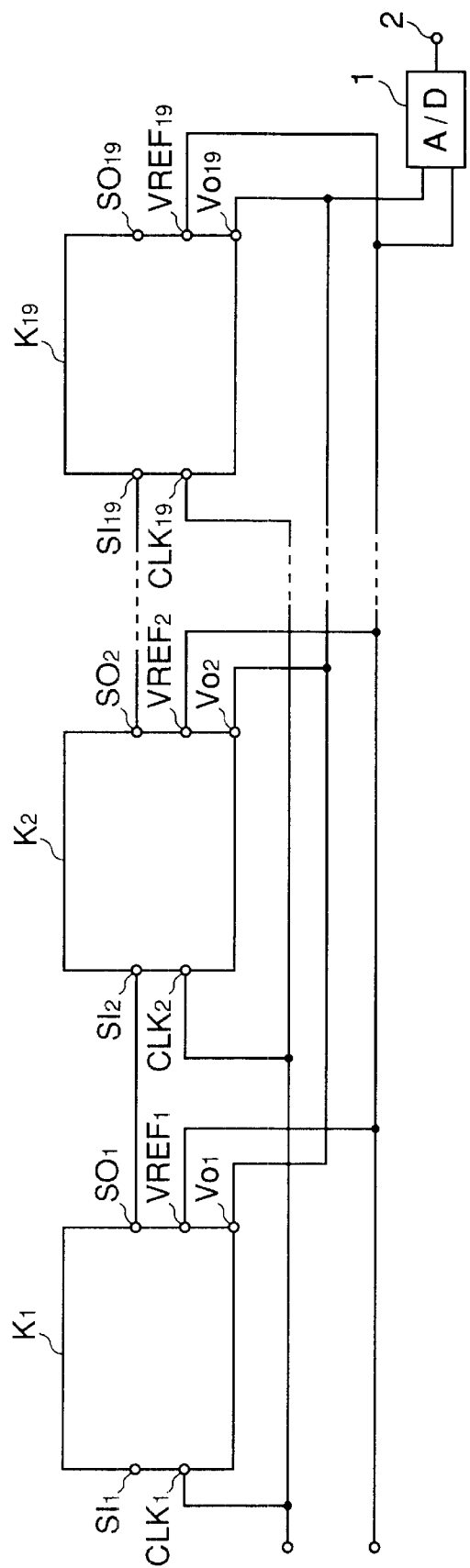
FIG. 1 is a diagram showing the outline of the overall configuration of the image-sensing device of a line type according to the invention.

As shown in FIG. 1, an image-sensing device (image sensor) is composed of 19 IC chips K1, K2, . . . K19 mounted on a printed circuit board (not shown) so as to form a row. The output signals from these chips K1, K2, . . . K19 are output sequentially via output terminals $Vo_1$, $Vo_2$, . . . , $Vo_{19}$, and are then converted by an A/D converter 1 into a digital signal, which is then delivered to an output terminal 2. The chips K1, K2, . . . K19 are all configured in the same manner. Here, as their representative, the internal circuit of the chip K1 will be described with reference to FIG. 2.

Figure 2:
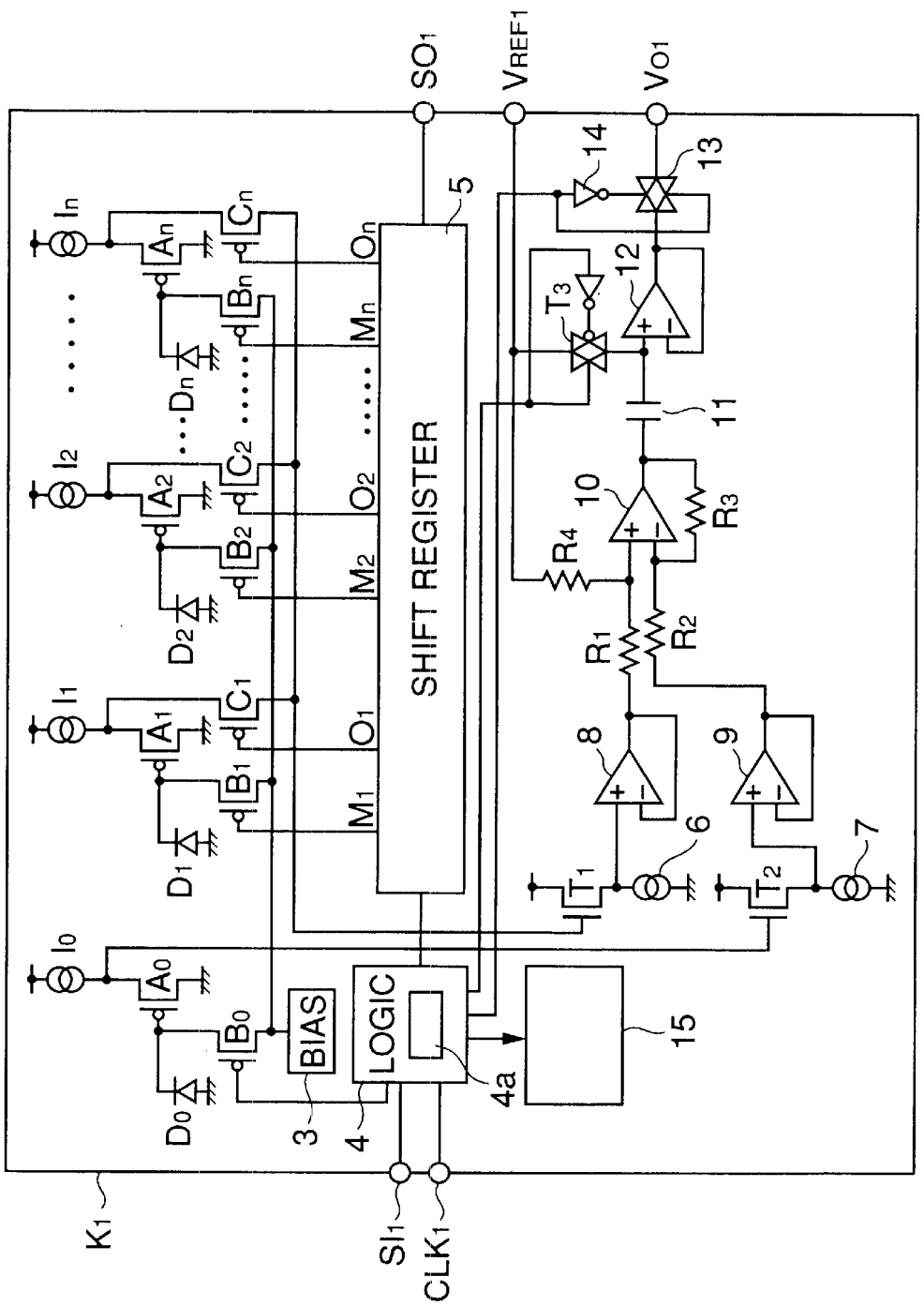
FIG. 2 is a circuit diagram of a semiconductor chip of a first embodiment of the invention for use in the image-sensing device shown in FIG. 1.

In FIG. 2, which shows the image-sensing semiconductor device of a first embodiment of the present invention, reference symbol D0 represents a dummy photodiode that has the same structure as but operates with different timing from other diodes D1, D2, . . . , Dn, which are photodiodes for image sensing. These photodiodes D0, D1, D2, . . . , Dn have their anode connected to ground, and have their cathode connected to the gate of the corresponding amplifying p-channel MOS transistors A0, A1, A2, . . . , An, respectively. These amplifying transistors A0, A1, A2, . . . , An have their source connected to the corresponding constant-current sources I0, I1, I2, . . . , In, respectively.

Reference symbols B0, B1, B2, . . . , Bn represent switching P-channel MOS transistors connected between the gate of the corresponding transistors A0, A1, A2, . . . , An, respectively, and a bias voltage feeding circuit 3. The transistor B0 has its gate connected to a logic circuit 4, and the transistors B1, B2, . . . , Bn have their gate connected to the output terminals M1, M2, . . . , Mn, respectively, of a shift register 5. These transistors B1, B2, . . . , Bn are turned on sequentially.

Reference symbols C1, C2, . . . , Cn represent switching p-channel MOS transistors for extracting the photoelectric conversion signals produced in the photodiodes D1, D2, . . . , Dn after amplification by the amplifying transistors A1, A2, . . . , An, respectively. These transistors C1, C2, . . . , Cn have their source connected to the source of the corresponding amplifying transistors A1, A2, . . . , An, and have their drain connected commonly to the gate of a first source-follower transistor T1 composed of an n-channel MOS transistor.

Moreover, these switching transistors C1, C2, . . . , Cn have their gate connected to the output terminals O1, O2, . . . , On of the shift register 5, and are turned on sequentially. The source of the amplifying transistor A0 corresponding to the dummy photodiode D0 is connected directly to the gate of a second source-follower transistor T2 composed of an n-channel MOS transistor, with no switching transistor connected in between.

Reference numerals 6 and 7 represent constant-current sources that are connected, at one end, to the sources of the source-follower transistors T1 and T2 and, at the other end, to ground. Reference numerals 8 and 9 represent buffer amplifiers that amplify the outputs of the source-follower transistors T1 and T2 and of which the outputs are fed through resistors R1 and R2 to the non-inverting input terminal (+) and the inverting input terminal (−), respectively, of a differential amplifier 10. The differential amplifier 10 has its output terminal connected through a feedback resistor R2 to its own inverting input terminal (−). Moreover, to the non-inverting input terminal (+) of the differential amplifier 10, a reference voltage fed in from the outside via the terminal $V_{REF1}$ of the chip K1 is fed through a resistor R4.

The output of the differential amplifier 10 is fed through a direct-current component eliminating capacitor 11 to the non-inverting input terminal (+) of a buffer amplifier 12 provided in the succeeding stage. This buffer amplifier 12 has its output terminal and inverting input terminal (−) short-circuited together. Moreover, to the non-inverting input terminal (+) of the buffer amplifier 12, the reference voltage fed in via the terminal $V_{REF1}$ is fed through a switching analog switch T3.

The analog switch T3 is connected to the logic circuit 4, and is kept on by a switching voltage fed from the logic circuit 4 until the signals from all of the photodiodes provided in the chip K1 have been read out. The output of the buffer amplifier 12 is delivered through an analog switch (output switch) 13 to the output terminal $Vo_1$ of the chip K1. The analog switch 13 is a switch of a transmission gate type, and is connected to an inverter 14 for feeding thereto, at one gate, a switching voltage of the opposite polarity to the switching voltage fed to the other gate. From the outside, a start trigger is fed in via a terminal $SI_1$, and a clock is fed in via a terminal $CLK_1$. The start trigger and clock thus fed in are both fed to the logic circuit 4.

Similarly, also the chips K2, ..., K19 shown in FIG. 1 receive the clock from the outside via their clock terminals $CLK_2$, ..., $CLK_{19}$. However, these chips K2, ..., K19 receive, via their start trigger terminals $SI_2$, ..., $SI_{19}$ for receiving their trigger signal, the pulse output from the shift register of the chip immediately preceding them. For example, the second chip K2 receives at its start trigger terminal $SI_2$ the pulse produced by the shift register 5 of the first chip K1 and fed out via the terminal $SO_1$ thereof. This pulse is produced after a pulse has appeared at the output terminal On, i.e. the last of all the output terminals O1, O2, ..., On, of the shift register 5. That is, after the outputs from all the pixels of the first chip K1 have been read out, a start trigger for the second chip K2 is produced.

Figure 3:
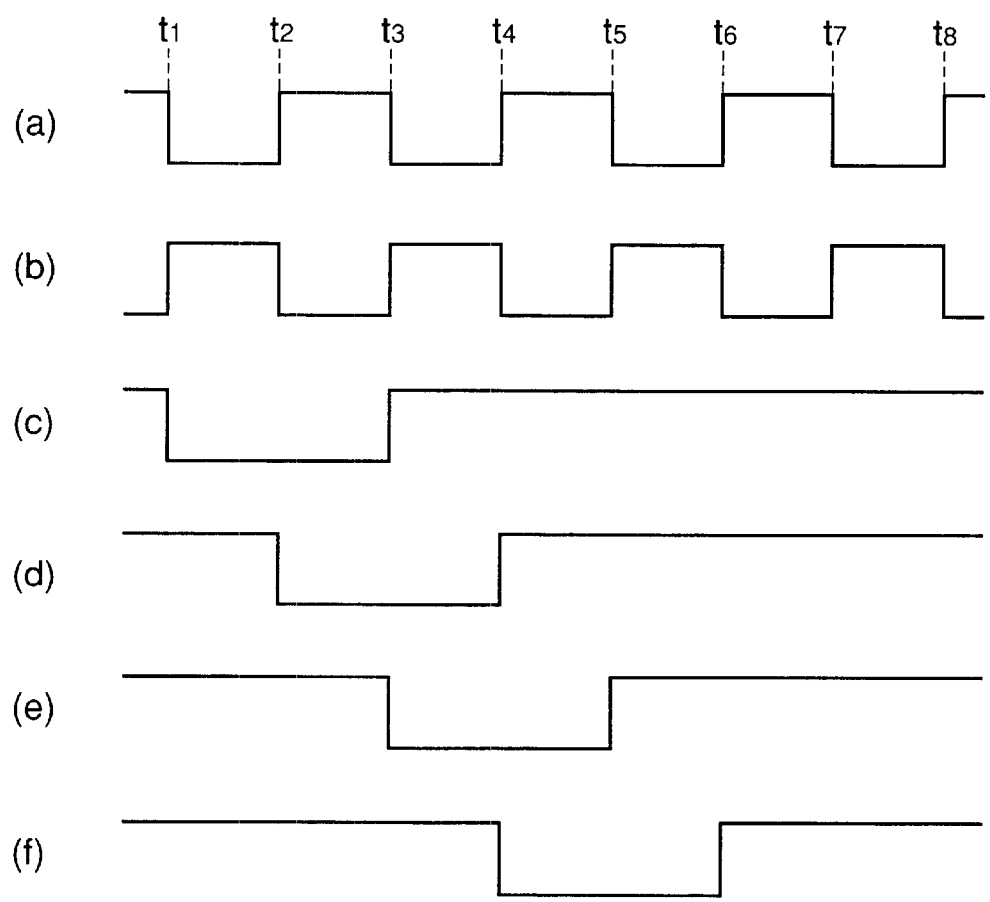
FIG. 3 is a waveform diagram illustrating the operation of the circuit shown in FIG. 2.

In FIG. 3, at (a) is shown the clock fed in via the terminal $CLK_1$. This clock is inverted by the logic circuit 4 and is thereby formed into switching pulses, as shown at (b) in FIG. 3, that are applied to the gate of the transistor B0. The transistor B0 is kept on while the switching pulses (b) are at a low level, i.e. in the periods from t2 to t3, from t4 to t5, from t6 to t7, ... While this transistor B0 is on, the dummy photodiode D0 is coupled to a bias circuit 3, and is thus fed with a bias therefrom. This bias is a positive voltage.

The clock is fed also through the logic circuit 4 to the shift register 5 so as to be formed into pulses having half the original frequency, as partially shown at (c) and (e) in FIG. 3, which are then fed via the terminals O1, O2, ..., On of the shift register 5 to the gates of the corresponding transistors C1, C2, ..., Cn, respectively. More specifically, the shift register 5, by outputting a negative pulse via the terminal O1 in the period from t1 to t3, then a negative pulse via the terminal O2 in the period from t3 to t5, and so forth, outputs a negative pulse having a pulse width corresponding to one period of the clock sequentially via one after another of the terminals O1, O2, ..., On.

Fed with the clock pulses, the shift register 5 outputs also pulses, as partially shown at (d) and (f) in FIG. 3, via the terminals M1, M2, ..., Mn. More specifically, the shift register 5, by outputting a negative pulse via the terminal M1 in the period from t2 to t4, then a negative pulse via the terminal M2 in the period from t4 to t6, and so forth, outputs a negative pulse having a pulse width corresponding to one period of the clock sequentially via one after another of the terminals M1, M2, ..., Mn. In FIG. 2, reference numeral 15 represents a circuit that drives the constant-current sources I0, I1, I2, ..., In, and 6 and 7.

Next, the operation of the circuit shown in FIG. 2 will be described. At (c) in FIG. 3, in the period from t1 to t3, the transistor C1 is on, and thus the signal accumulated in the photodiode D1 is read out; however, in the period from t2 to t4, the transistor B1 is on, and thus the signal from the photodiode D1 is "reset-biased" to the bias voltage (hereafter described simply as "reset"). Thus, only the signal that is read out from the photodiode D1 in the period from t1 to t2 is valid. The signal read out in this period from t1 to t2 is fed through the source-follower transistor T1, the buffer amplifier 8, and the resistor R1 to the non-inverting input terminal (+) of the differential amplifier 10.

On the other hand, in the period from t2 to t3, the transistor B0 is on, and thus the dummy photodiode D0 is reset; however, the output of the amplifying transistor A0 is kept fed through the source-follower transistor T2, the buffer amplifier 9, and the resistor R2 to the inverting input terminal (−) of the differential amplifier 10. It is to be noted that, of the negative pulses shown at (b) in FIG. 3, the negative pulse appearing immediately before the period from t1 to t2 also causes the transistor B0 to be turned on, and thereby causes the output signal of the dummy photodiode D0 to be reset to the bias voltage. Then, after this resetting, the signal output from the dummy photodiode D0 in the period from t1 to t2 and the signal read out from the photodiode D1 in the same period from t1 to t2 are subjected to differential amplification by the differential amplifier 10.

Through this differential amplification, the component of the output signal of the photodiode D1 that is attributable to the variation in characteristics of the photodiode D1 (i.e. the error component of the output signal of the photodiode D1) is eliminated. This is achieved because the output signal of the dummy photodiode D0 contains the same error component (more precisely, the output signal of the dummy photodiode D0 consists solely of the error component) and the error component in one signal is canceled with the same error component in the other signal through differential amplification.

The output of the differential amplifier 10 is fed through a direct-current component eliminating capacitor 11 to the buffer amplifier 12 in the succeeding stage. At this time, the analog switch T3 is on, and a direct-current voltage (bias voltage) is fed in via the terminal $V_{REF1}$. The output of the differential amplifier 10 contains a considerably large offset of a direct-current voltage, but this direct-current voltage is eliminated therefrom by the capacitor 11, and instead a new predetermined direct-current voltage is introduced from the outside via the terminal $V_{REF1}$ and through the analog switch T3. Thus, the output of the differential amplifier 10 is, by being passed through the buffer amplifier 12, formed into a signal whose level is evaluated with respect to the newly-introduced direct-current voltage.

The signal from which the offset is eliminated in this way is then delivered through the output switch 13 to the output terminal $Vo_1$. The signal thus delivered is then converted by the A/D converter 1 into a digital signal as shown in FIG. 1. The reference voltage of the A/D converter 1 is so set as to coincide with the direct-current voltage fed in from the outside to the buffer amplifier 12. In the manner described above, in the period from t1 to t2, the signal is read out from the photodiode D1 and processed.

Next, in the period from t2 to t3, the transistor B0 is on, and thus the output signal of the dummy photodiode D0 is reset to the bias voltage; the transistor B1 is turned on, and thus the output signal of the photodiode D1 also is reset to the bias voltage. In the next period from t3 to t4, the dummy photodiode B0 has already recovered from the reset state, and the signal from the photodiode D1 has already been read out. In the period from t3 to t4, the photodiode D1 is kept reset until it recovers from the reset state at the time point T4. Moreover, in this period, the signal from the next photodiode D2 is fed out. The signal from the photodiode D1 is read out next time when all the photodiodes D2, ..., Dn of the chip K1 and then all the photodiodes of the chips K2, ..., K19 have been read out and the procedure has returned to the reading of the chip K1.

When the signals from the photodiodes D1 to Dn of the chip K1 have been read out, the shift resistor 5 outputs a pulse via its terminal $SO_1$. This pulse serves as a start trigger for the next chip K2, and thus the procedure proceeds to the reading of the chip K2. The reading of the chip K1 ends with turning off the output switch 13. The voltage that controls the output switch 13 is fed from the logic circuit 4, which produces the voltage from the clock fed thereto.

Figure 4:
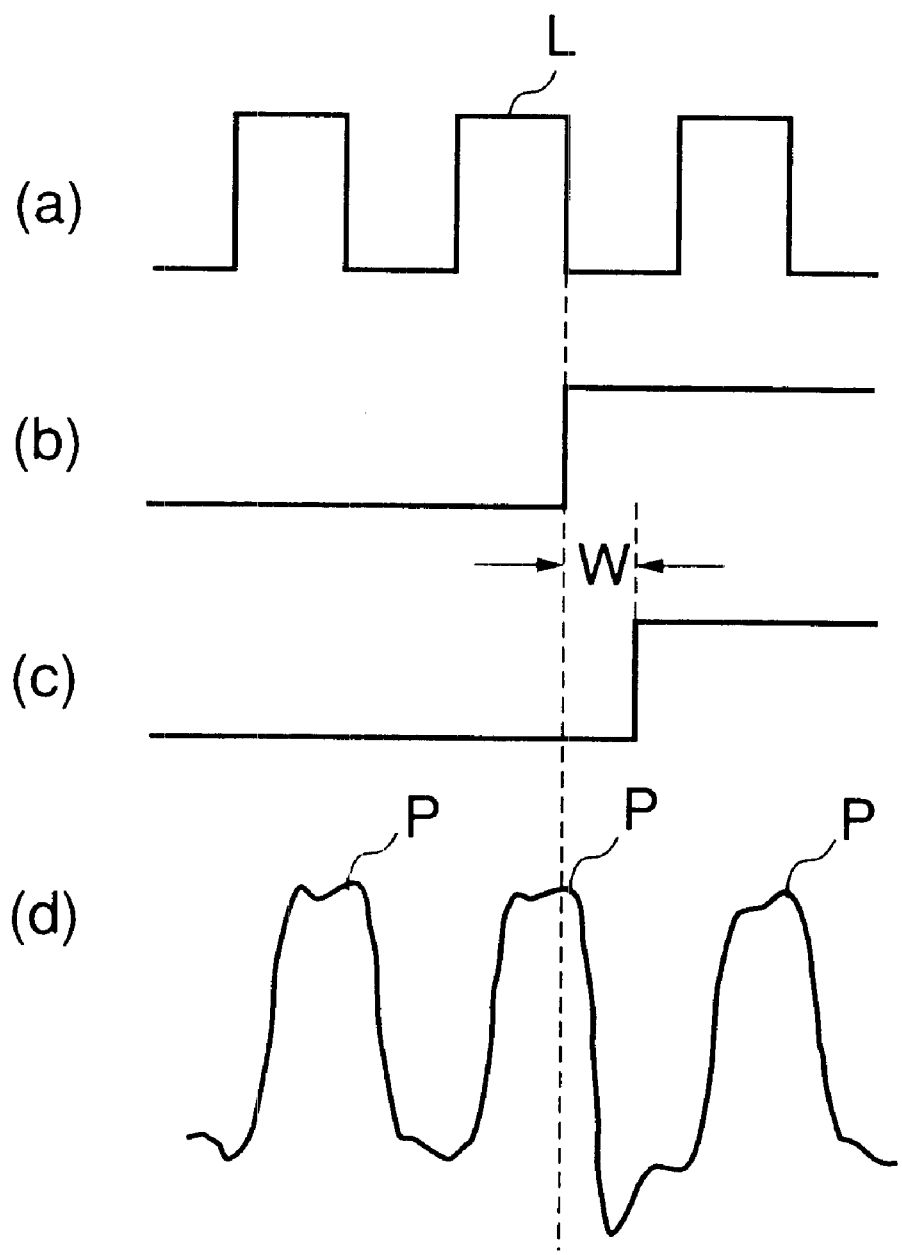
FIG. 4 is another waveform diagram illustrating the operation of the circuit shown in FIG. 2.

In FIG. 4, at (a) is shown the clock fed to the logic circuit 4, and at (b) is shown the control voltage of the output switch 13. When the control voltage is at a low level, the output switch 13 is kept on, and when the control voltage is at a high level, the output switch 13 is kept off. To end the reading of the chip K1, the control voltage is shifted from a low level to a high level at a trailing edge of a clock pulse L.

In the circuit shown in FIG. 2, the signal paths for processing the signals from the photodiodes include amplifiers and others, and this causes a delay in signal transfer. On the other hand, the control voltage is produced from the clock by the logic circuit 4, and therefore almost no delay occurs in the clock. The signal appearing at the output terminal has a waveform as shown at (d) in FIG. 4, and therefore, when the A/D converter 1 uses the information of the levels at points P of this signal, the chip K1 fails to output the portions corresponding to the point P of the last-stage photodiode Dn of the chip K1.

To prevent this, in this embodiment, the logic circuit 4 is provided with a delay circuit 4a that outputs the control voltage of the output switch 13 with a delay W as shown in FIG. 4. Accordingly, in this embodiment, the voltage that controls the output switch 13 has a waveform as shown at (c) in FIG. 4. This ensures output of the desired signal information. In FIG. 4, the signal shown at (d) after the control voltage shown at (c) has turned to a high level is the signal of the first photodiode of the chip K2.

Figure 5:
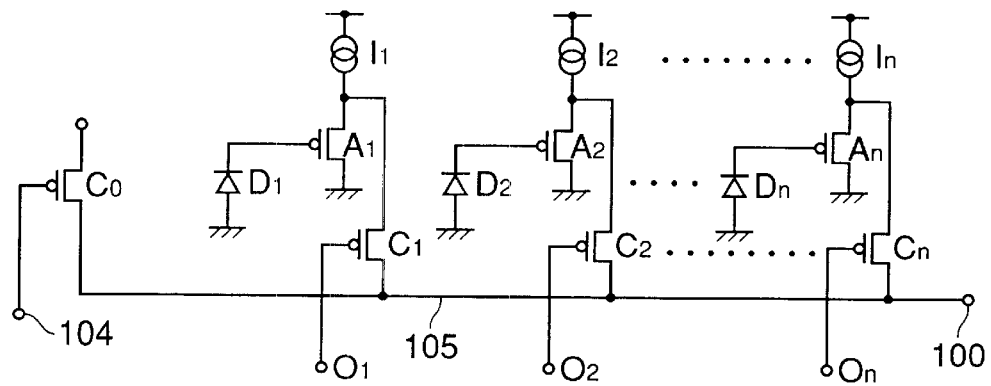
FIG. 5 is a circuit diagram of a second embodiment of the invention.

FIG. 5 shows a second embodiment of the present invention. Here, such elements as are found also in FIG. 2 are identified with the same reference numerals and symbols, and their descriptions will be omitted. Reference symbol C0 represents a dummy switching transistor introduced according to the present invention. This switching transistor C0 is a p-channel MOS transistor just like the other switching transistors C1, C2, . . . , Cn.

Figure 6:
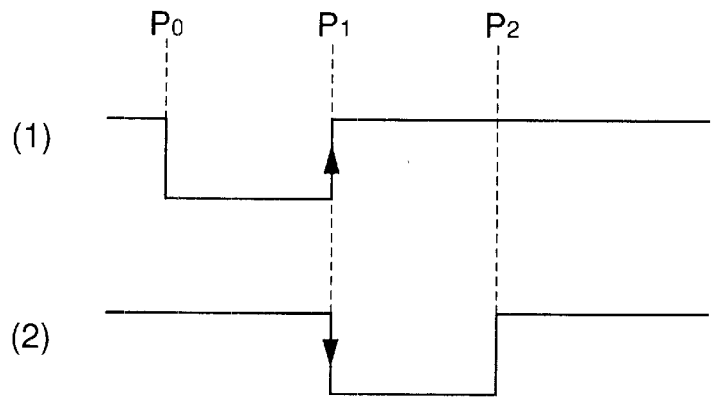
FIG. 6 is a waveform diagram illustrating the operation of the second embodiment.

The switching transistor C0 receives at its gate a switching voltage as shown at (1) in FIG. 6 via a terminal 104. This switching voltage is fed in before the switching voltage (shown at (2) in FIG. 6) that is applied to the gate of the switching transistor C1 of the first pixel is fed in. The switching transistor C0 has its source left open, i.e. unconnected, and has its drain connected to the output terminal 100.

As shown in FIG. 6, the dummy switching transistor C0 is kept on in the period from P0 to P1, i.e. prior to the period from P1 to P2 in which the first switching transistor C1 is kept on. Then, the switching transistor C0 is turned off simultaneously when the first switching transistor C1 is turned on. Accordingly, the effect of the voltage at a trailing edge (i.e. at the time point P1) of the switching signal applied to the gate of the first switching transistor C1 is canceled with the effect of the voltage at a rising edge (i.e. at the time point P1) of the switching signal applied to the gate of the dummy switching transistor C0.

Figure 18:
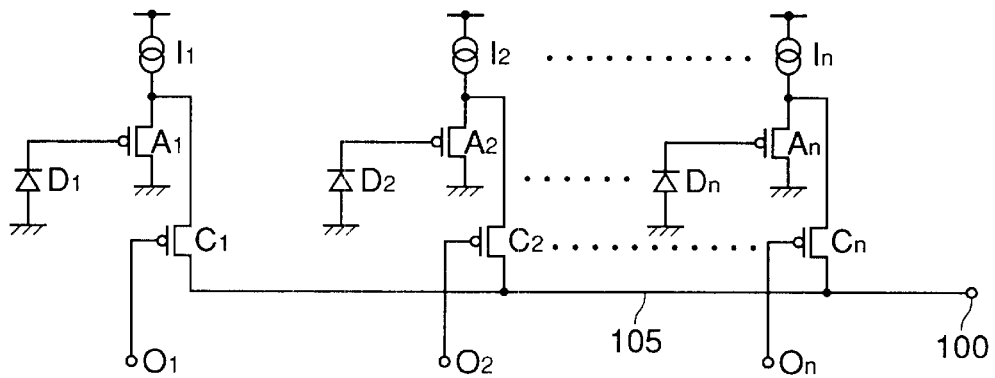
FIG. 18 is a diagram showing the configuration of a plurality of image-sensing circuits provided in a conventional image-sensing device of a line type.
Figure 19:
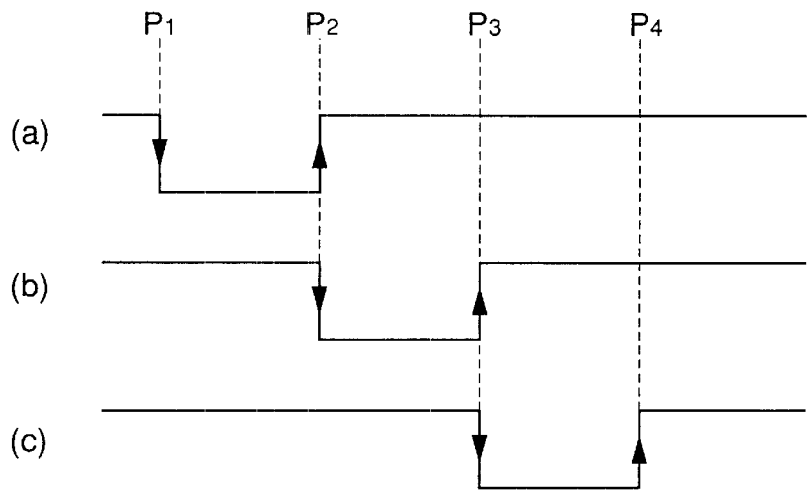
FIG. 19 is a waveform diagram illustrating the operation of the conventional image-sensing device shown in FIG. 18.
Figure 20:
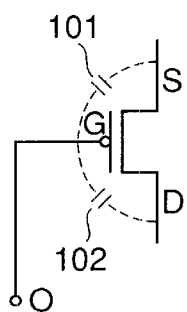
FIG. 20 is a diagram illustrating the problem inevitable in the conventional image-sensing device shown in FIG. 18.

More specifically, whereas the dropping voltage in the voltage applied to the gate of the first switching transistor C1, through the parasitic capacitance 102 (see FIG. 20), causes the voltage on the output line 105 to drop, the rising voltage in the voltage applied to the gate of the dummy switching transistor C0, through the parasitic capacitance, causes the voltage on the output line 105 to rise. As a result, no effect of the switching voltages is likely to appear in the output from the first pixel. How the second and following pixels achieve output is the same as in the conventional example described earlier with reference to FIG. 18. In this embodiment, there is no difference in characteristics between the first pixel and the rest of the pixels.

Figure 7:
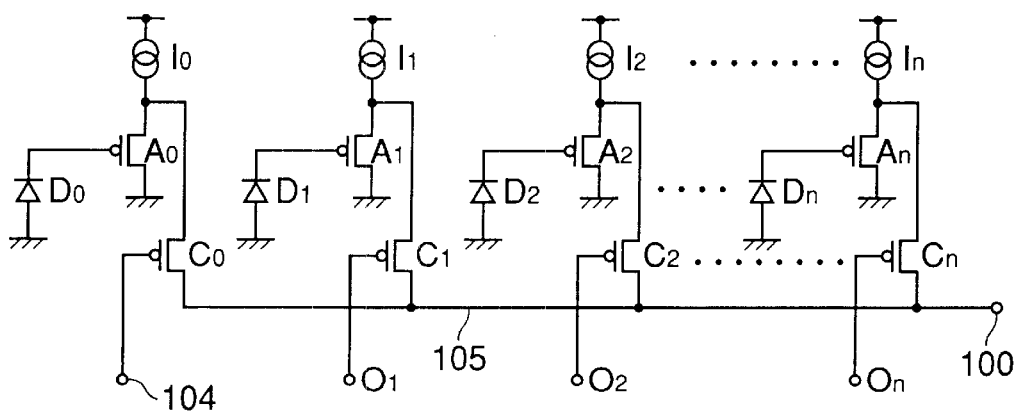
FIG. 7 is a circuit diagram of a third embodiment of the invention.

FIG. 7 shows a third embodiment of the present invention. Here, a dummy photodiode D0 and a dummy amplifying transistor A0 are additionally provided, and the source of the previously described dummy switching transistor C0 is connected to the source of the dummy amplifying transistor A0. In other respects, this embodiment is the same as that shown in FIG. 5.

Figure 8:
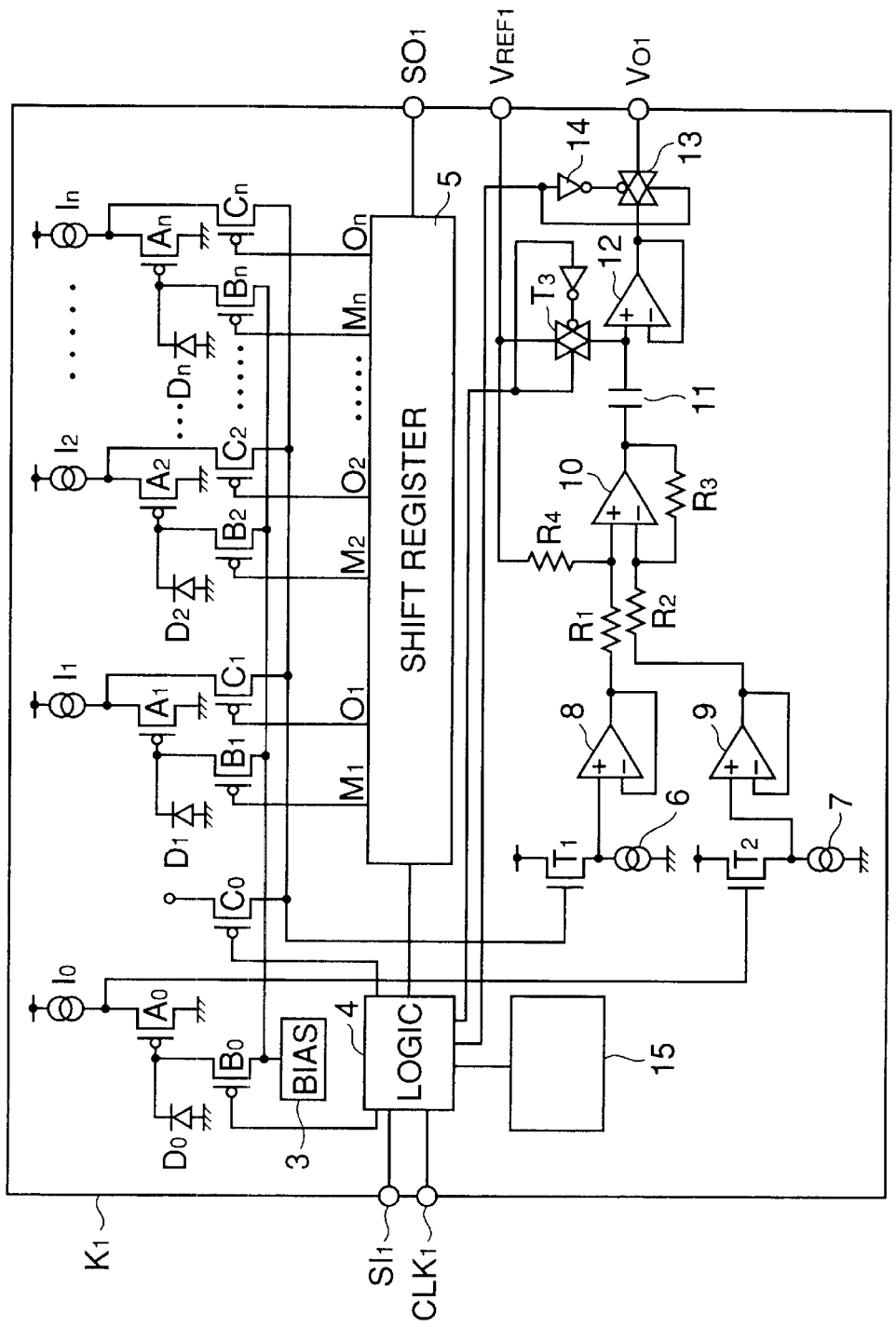
FIG. 8 is a circuit diagram of a fourth embodiment of the invention.

Next, as a fourth embodiment of the present invention, an image-sensing device of a line type employing the circuit shown in FIG. 5 will be described with reference to FIGS. 8 and 9. In this embodiment, the image-sensing device is, as shown in FIG. 1, composed of 19 IC chips K1, K2, . . . K19 mounted on a printed circuit board (not shown) so as to form a row. The outputs from these chips K1, K2, . . . K19 are output sequentially, and are then converted by an A/D converter 1 into a digital signal, which is then delivered to an output terminal 2. The chips K1, K2, . . . K19 are all configured in the same manner. Here, as their representative, the internal circuit of the chip K1 will be described with reference to FIG. 8. In FIG. 8, such elements as are found also in FIG. 2 are identified with the same reference numerals and symbols, and their descriptions will be omitted.

As in the second embodiment (FIG. 5) described earlier, the dummy switching transistor C0 has its source left open. The dummy transistor C0 has its drain connected to the gate of the first source-follower transistor T1, and has its gate connected to the logic circuit 4 so as to receive a switching voltage as shown at (1) in FIG. 6. The switching voltage for this transistor C0 may be fed from the shift register 5. In that case, it is necessary to additionally provide a terminal that precedes the terminal O1.

Figure 9:
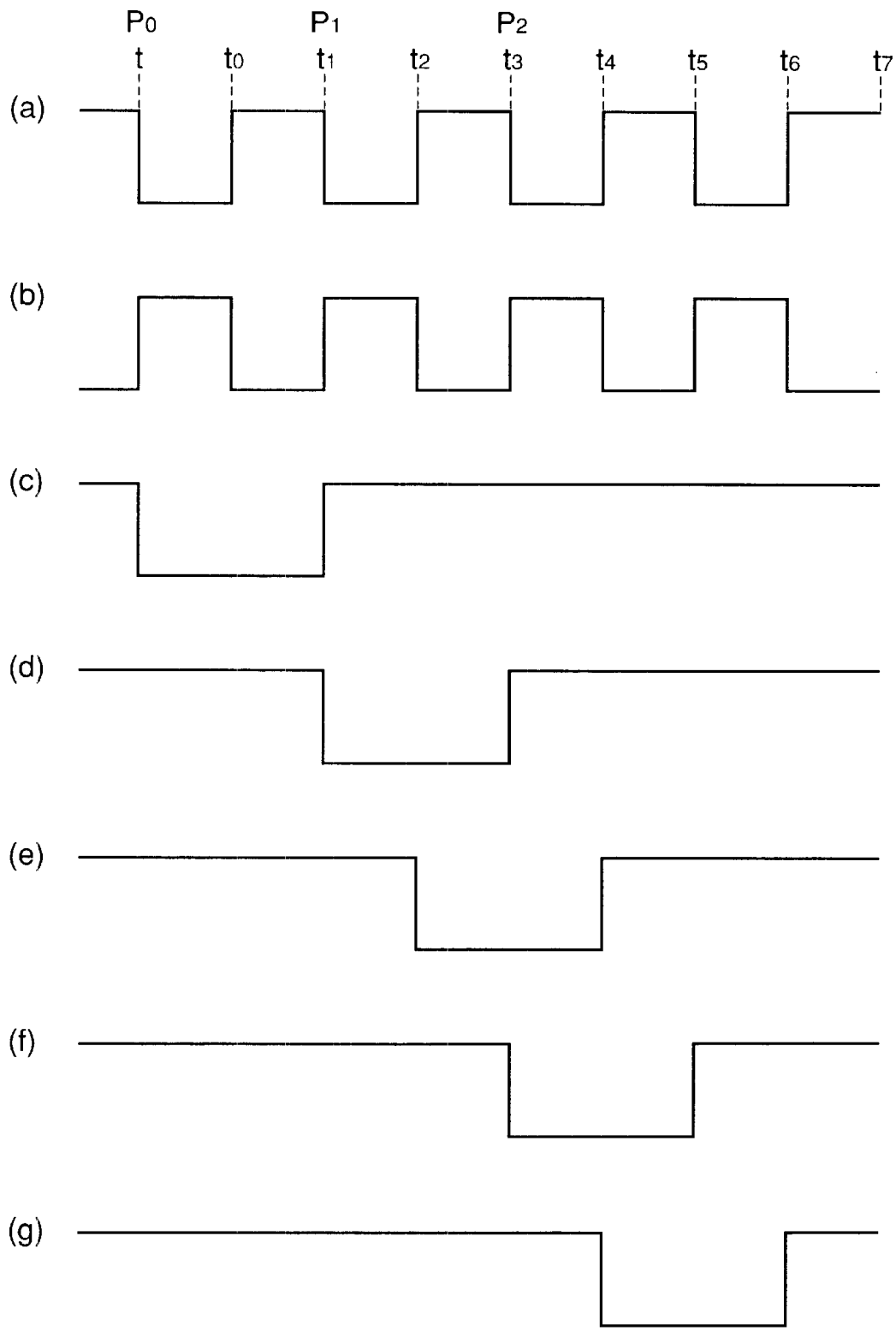
FIG. 9 is a waveform diagram illustrating the operation of the fourth embodiment.

In FIG. 9, at (a) is shown the clock fed in via the terminal $CLK_1$. This clock is inverted by the logic circuit 4 and is thereby formed into switching pulses, as shown at (b) in FIG. 3, that are applied to the gate of the transistor B0. The transistor B0 is kept on while the switching pulses (b) are at a low level, i.e. in the periods from to to t1, from t2 to t3, from t4 to t5, from t6 to t7, . . . While this transistor B0 is on, the dummy photodiode D0 is coupled to a bias circuit 3, and is thus fed with a bias therefrom. This bias is a positive voltage. Moreover, the logic circuit 4 outputs a negative pulse having a pulse width corresponding to one period of the clock and feeds it to the gate of the dummy transistor C0.

The clock is fed also through the logic circuit 4 to the shift register 5 so as to be formed into pulses having half the original frequency, as partially shown at (d) to (f) in FIG. 9, which are then fed via the terminals O1, O2, . . . , On of the shift register 5 to the gates of the corresponding transistors C1, C2, . . . , Cn, respectively. More specifically, the shift register 5, by outputting a negative pulse via the terminal O1 in the period from t1 to t3, then a negative pulse via the terminal O2 in the period from t3 to t5, and so forth, outputs a negative pulse having a pulse width corresponding to one period of the clock sequentially via one after another of the terminals O1, O2, . . . , On.

Fed with the clock pulses, the shift register 5 outputs also pulses, as partially shown at (e) to (g) in FIG. 9, via the terminals M1, M2, ..., Mn. More specifically, the shift register 5, by outputting a negative pulse via the terminal M1 in the period from t2 to t4, then a negative pulse via the terminal M2 in the period from t4 to t6, and so forth, outputs a negative pulse having a pulse width corresponding to one period of the clock sequentially via one after another of the terminals M1, M2, ..., Mn.

Next, the operation of the circuit shown in FIG. 8 will be described. At (d) in FIG. 9, in the period from t1 to t3, the transistor C1 is on, and thus the signal accumulated in the photodiode D1 is read out; however, in the period from t2 to t4, the transistor B1 is on, and thus the signal from the photodiode D1 is "reset-biased" to the bias voltage (hereafter described simply as "reset"). Thus, only the signal that is read out from the photodiode D1 in the period from t1 to t2 is valid. The signal read out in this period from t1 to t2 is fed through the source-follower transistor T1, the buffer amplifier 8, and the resistor R1 to the non-inverting input terminal (+) of the differential amplifier 10. Here, the effect, on the output signal, of the drop in the switching voltage just when the transistor C1 is turned on (i.e. at the time point P1) is canceled with the effect of the rise in the switching voltage of the transistor C0 that is turned off at the time point P1 as shown at (c) in FIG. 9, quite in the same manner as with the transistors C2 to Cn. This helps greatly reduce variations accompanying rises and drops in the switching voltages.

On the other hand, in the period from t2 to t3, the transistor B0 is on, and thus the dummy photodiode D0 is reset; however, the output of the amplifying transistor A0 is kept fed through the source-follower transistor T2, the buffer amplifier 9, and the resistor R2 to the inverting input terminal (−) of the differential amplifier 10. It is to be noted that, of the negative pulses shown at (b) in FIG. 9, the negative pulse appearing immediately before the period from t1 to t2 also causes the transistor B0 to be turned on, and thereby causes the output signal of the dummy photodiode D0 to be reset to the bias voltage. Then, after this resetting, the signal output from the dummy photodiode D0 in the period from t1 to t2 and the signal read out from the photodiode D1 in the same period from t1 to t2 are subjected to differential amplification by the differential amplifier 10.

Figure 10:
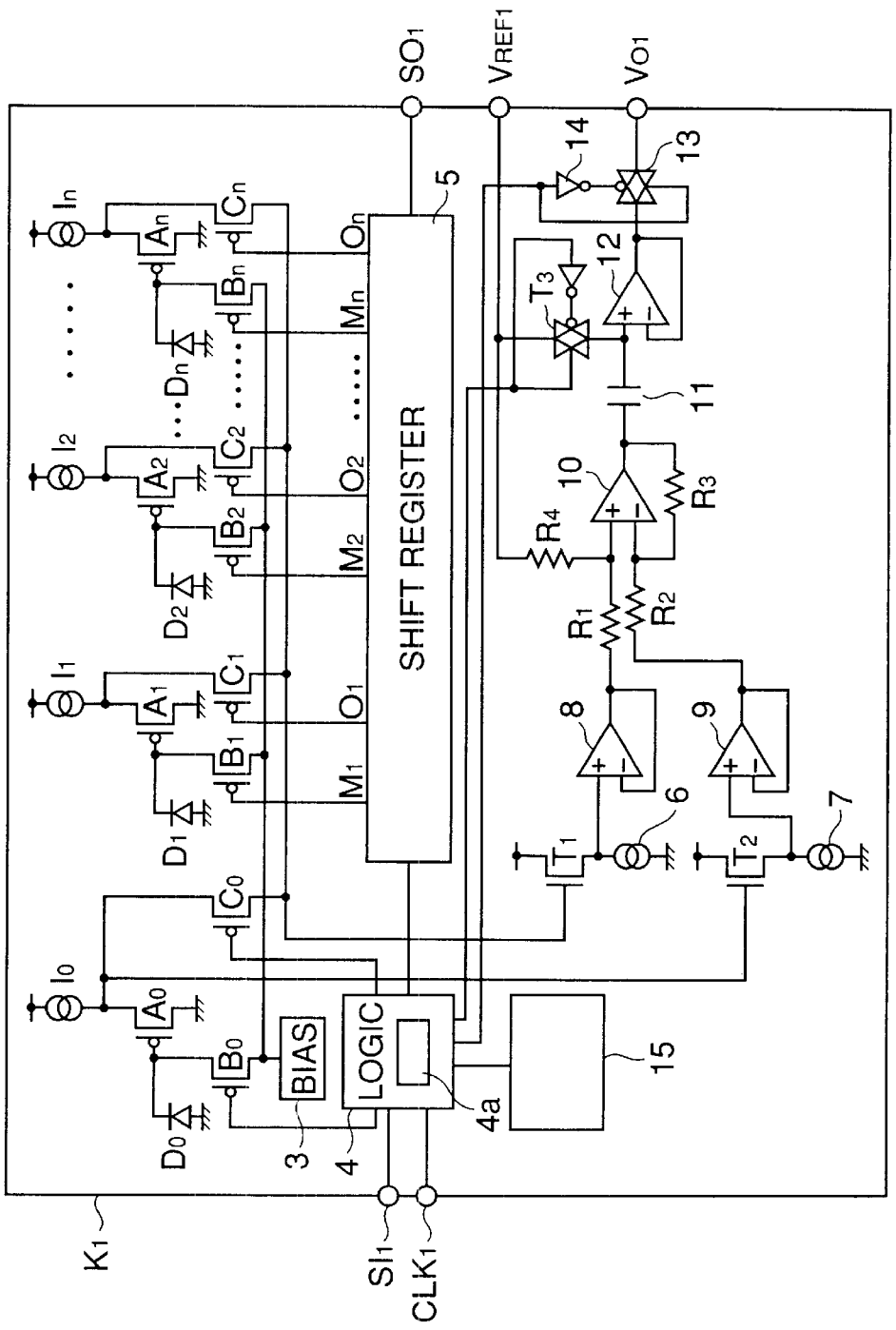
FIG. 10 is a circuit diagram of a fifth embodiment of the invention.

FIG. 10 shows, as a fifth embodiment of the present invention, an image-sensing device of a line type employing the circuit shown in FIG. 7 described above. The circuit configuration of this embodiment differs from that shown in FIG. 8 described above only in that the source of the dummy switching transistor C0 is not left open but connected to the source of the dummy amplifying transistor A0. In other respects, the circuit configuration of this embodiment is the same as that shown in FIG. 8.

Figure 11:
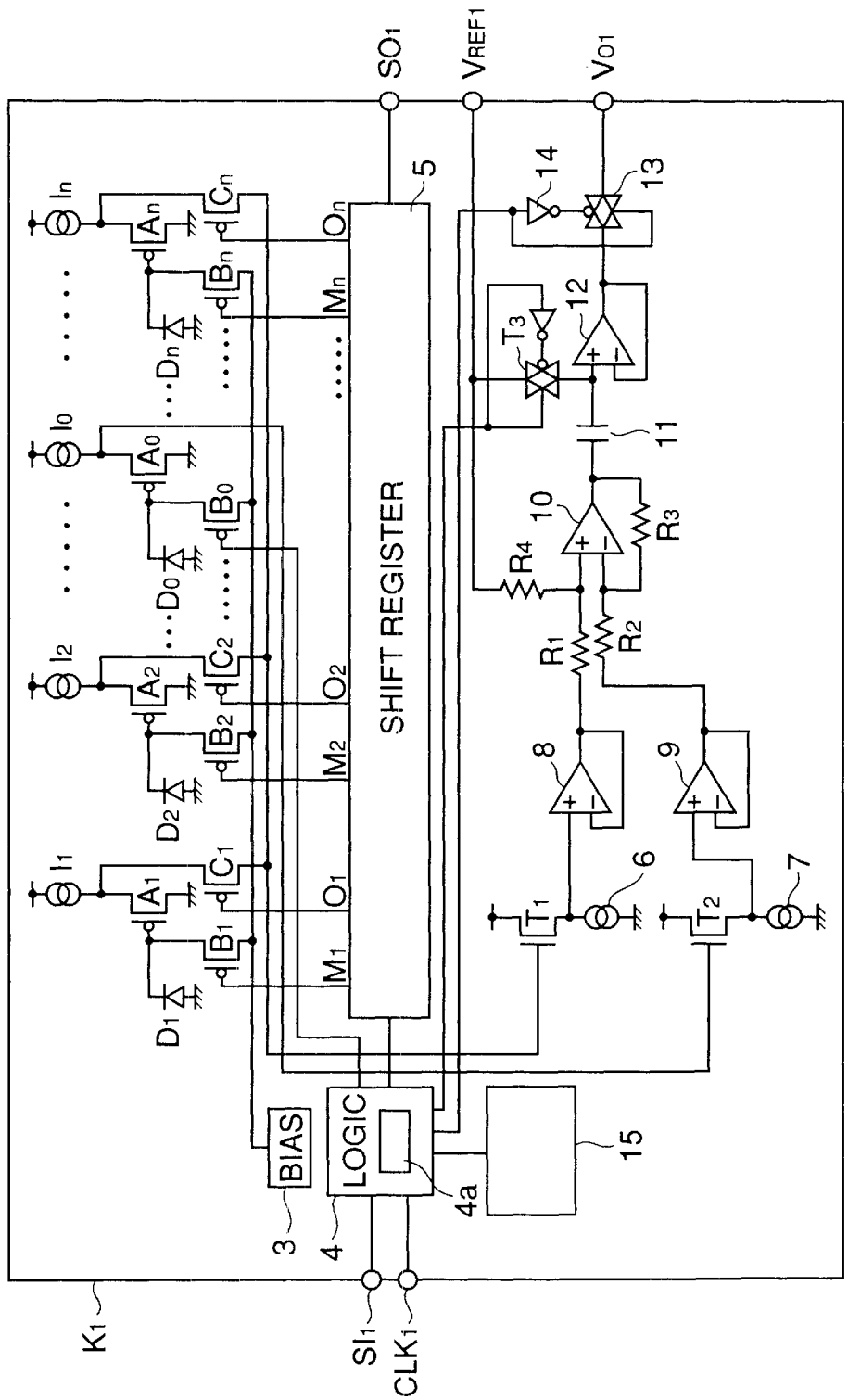
FIG. 11 is a circuit diagram of a sixth embodiment of the invention.

Next, FIG. 11 shows the configuration of a sixth embodiment of the present invention. This configuration differs from that shown in FIG. 2 described above in that the portion including the dummy photodiode D0, amplifying transistor A0, switching transistor B0, and constant-current source 10 is arranged not at an end of the row of the photodiodes D1, D2, ..., Dn, but at the center thereof.

In the configuration shown in FIG. 11, the dummy photodiode D0, switching transistor B0, and others operate in the same manner and with the same timing as in the configuration shown in FIG. 2. Thus, as described previously in connection with FIG. 2, it is possible to eliminate the error components, attributable to variations in characteristics inevitable in manufacture, contained in the output signals from the dummy photodiode D0 and the image-sensing photodiodes D1, D2, ..., Dn.

This layout is adopted for the following reason. In general, manufacture-attributable variations in characteristics among photodiodes tend to be small among photodiodes that are close to one another and increase as the distances between photodiodes increase. For example, the photodiodes D1 and Dn show greatly different variations. In this embodiment, this has been taken into consideration, and the dummy photodiode is arranged near the center of the photodiodes D1 to Dn. This helps make the error components contained in the signals from the photodiodes D1 to Dn comparatively equal to that contained in the signal from the dummy photodiode D0. Thus, it is possible to obtain accurate image-sensing outputs.

Figure 12:
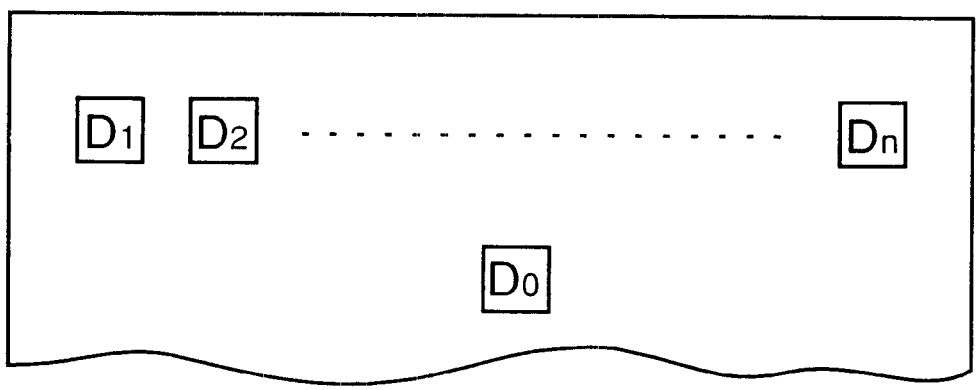
FIG. 12 is a block diagram showing the configuration of the sixth embodiment in a simplified manner.

In the configuration shown in FIG. 11, the portion including the dummy elements is arranged in the row of the photodiodes D1 to Dn. This, however, makes the pitch between the image-sensing photodiodes D1 D2, ..., Dn partially irregular. To prevent this, it is also possible, as shown in FIG. 12, to arrange the portion including the dummy elements not in the row but close to the row of the photodiodes D1 to Dn at the center thereof. In FIG. 12, the photodiodes D1, D2, ..., Dn and the dummy photodiode D0 are each represented as a block. Also in the configurations shown in FIGS. 5, 7, 8, and 10, the dummy photodiode D0 may be arranged not at an end but near the center of the row of the image-sensing photodiodes D1 to Dn.

Figure 13:
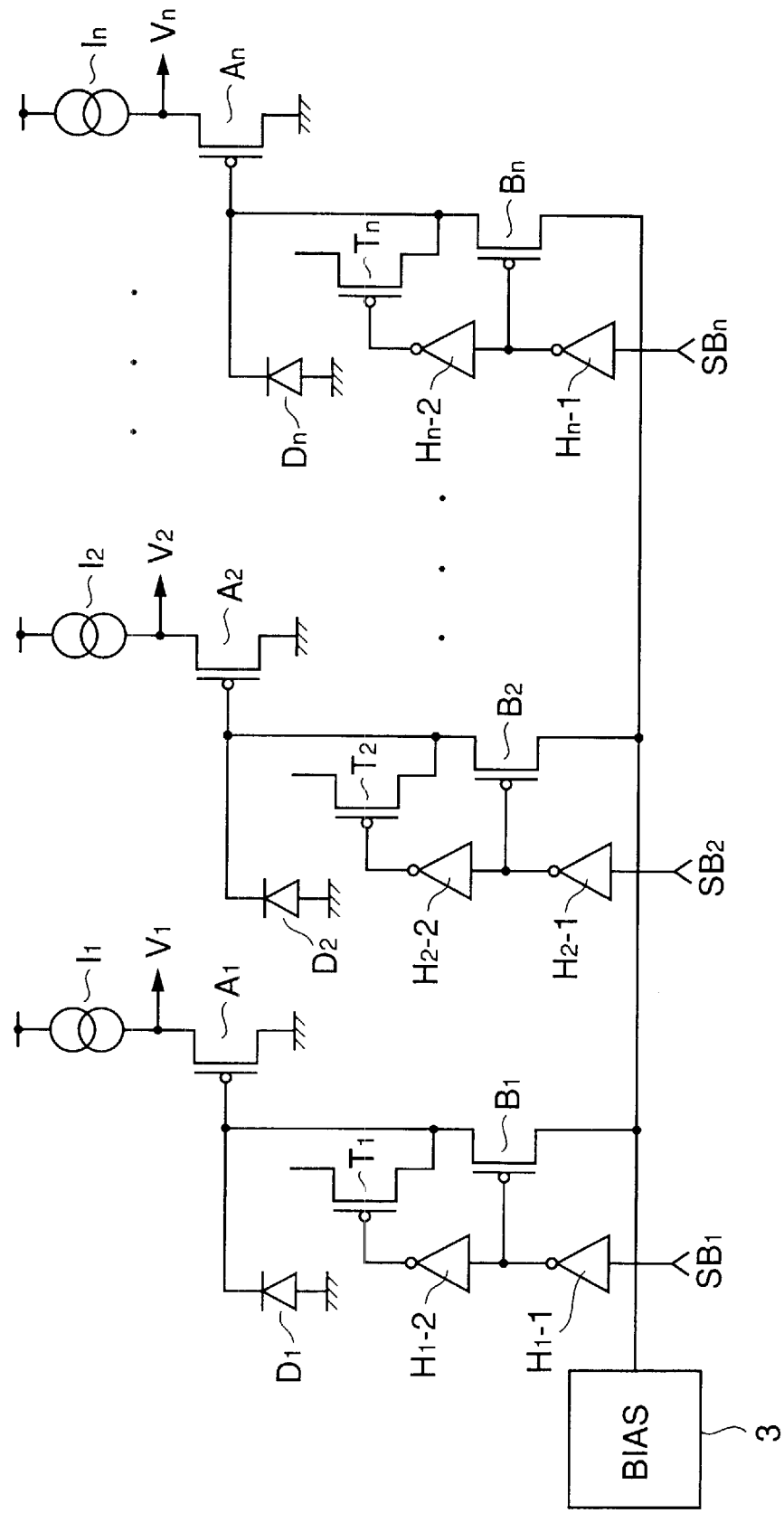
FIG. 13 is a circuit diagram of a seventh embodiment of the invention.

Next, a seventh embodiment of the present invention will be described with reference to FIG. 13. In FIG. 13, such elements as are found also in FIG. 2 are identified with the same reference numerals and symbols. A photodiode $D_k$ and a transistor $B_k$ are connected together, and their node is connected to the drain of a p-channel MOS transistor $T_k$. The transistor $B_k$ receives at its gate the signal output from an inverter $H_k$-1. The signal output from the inverter $H_k$-1 is fed also through an inverter $H_k$-2 to the gate of the transistor $T_k$. The source of the transistor $T_k$ is left unconnected. Here, the suffix k attached to reference symbols represents 1, 2, ..., n.

Figure 14:
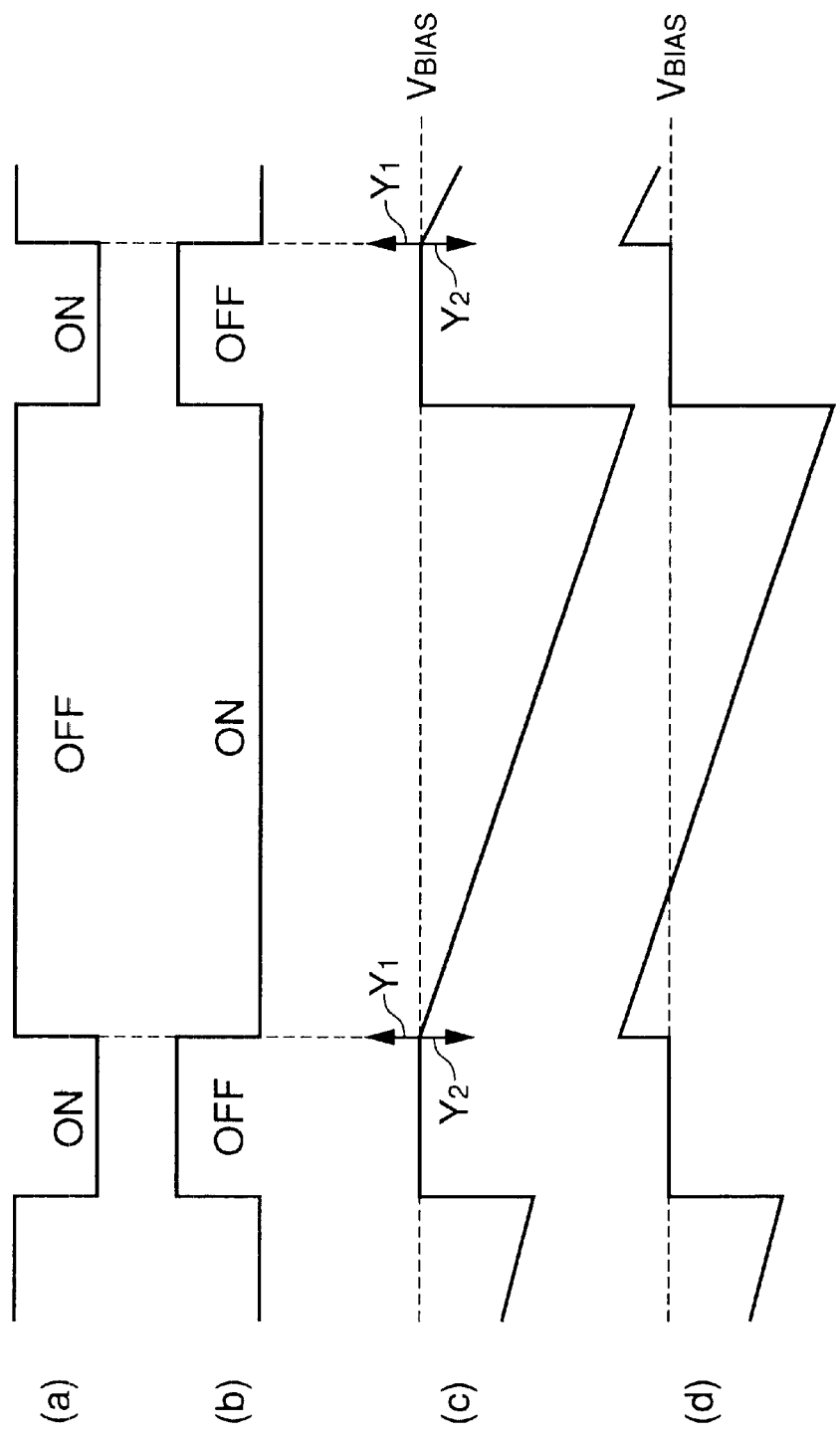
FIG. 14 is a diagram illustrating the operation of the seventh embodiment.

In this configuration, the transistors $B_k$ and $T_k$ receive, at their gates, signals as shown at (a) and (b), respectively, in FIG. 14, so that these transistors $B_k$ and $T_k$ operate in inverted logic with respect to each other. Thus, when the transistor $B_k$ is switched from on to off, the gate voltage of the transistor $T_k$ drops.

Accordingly, when the transistor $B_k$ is switched from on to off, as indicated by arrow $Y_1$ at (c) in FIG. 14, the parasitic capacitance present between the gate and drain of the transistor $B_k$ acts to shift the voltage at the node between the photodiode $D_k$ and the transistor $B_k$ above the bias voltage $V_{BIAS}$. However, simultaneously, as shown by arrow $Y_2$ at (c) in FIG. 14, the parasitic capacitance present between the gate and drain of the transistor $T_k$ acts to shift the same voltage below the bias voltage $V_{BIAS}$. Thus, the action of one parasitic capacitor is canceled with the action of the other.

This helps reduce the shifting of the voltage at the node between the photodiode $D_k$ and the transistor $B_k$ caused by the parasitic capacitance present between the gate and drain of the transistor $B_k$ when the transistor $B_k$ is switched from on to off.

By contrast, without the transistor $T_k$ and the inverters $H_k$-1 an $H_k$-2 when the signal applied to the gate of the transistor $B_k$ is switched from a low level to a high level and thereby the transistor $B_k$ is switched from on to off, as shown at (d) in FIG. 14, owing to the parasitic capacitance present between the gate and drain of the transistor $B_k$, the voltage at the node between the photodiode $D_k$ and the transistor $B_k$ shifts several millivolts to tens of millivolts above the bias voltage $V_{BIAS}$.

In this embodiment, the transistors $B_k$ and $T_k$ are formed to exhibit sufficient parity in terms of their size, arrangement, and other aspects so that the parasitic capacitances present between their gate and drain are approximately equal. In addition, the transistors $B_k$ and $T_k$ are fed, at their gates, with signals having approximately symmetrical slopes through the inverters $H_k$-1 and $H_k$-2, respectively, so that the high-level voltages, and also the low-level voltages, applied to their gates are equal.

As a result, when the transistor $B_k$ is switched from on to off, substantially no shifting is caused in the voltage at the node between the photodiode $D_k$ and the transistor $B_k$ by the parasitic capacitance present in the transistor $B_k$. Thus, even if the parasitic capacitance between the gate and drain of the transistor differs from pixel to pixel, it is possible to eliminate variations in the levels of the signals $V_1, V_2, \ldots, V_n$ output from the individual pixels.

In this embodiment, as the biasing switching device for applying a bias voltage to the photodiode, and as the switching device that is connected to the node between the photodiode and the biasing switching transistor, MOS transistors are used. However, as these switching devices, it is also possible to use bipolar transistors.

Figure 15:
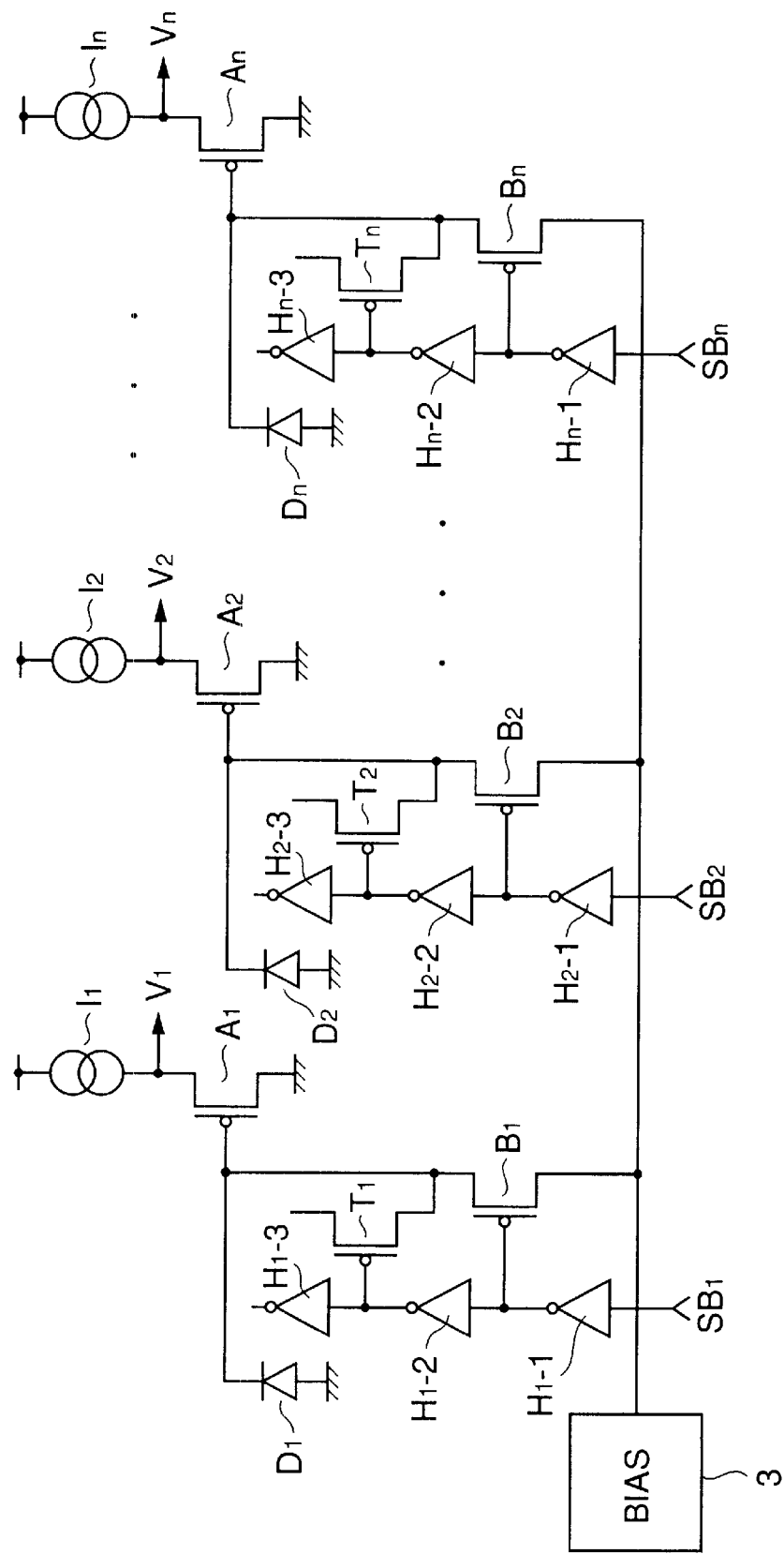
FIG. 15 is a circuit diagram of an eighth embodiment of the invention.

FIG. 15 shows an eighth embodiment of the present invention. Here, the output of the inverter $H_k$-2 is connected to the input of a dummy inverter $H_k$-3. This is preferable because, then, the input capacitance due to the inverter $H_k$-2 is canceled.

Figure 16:
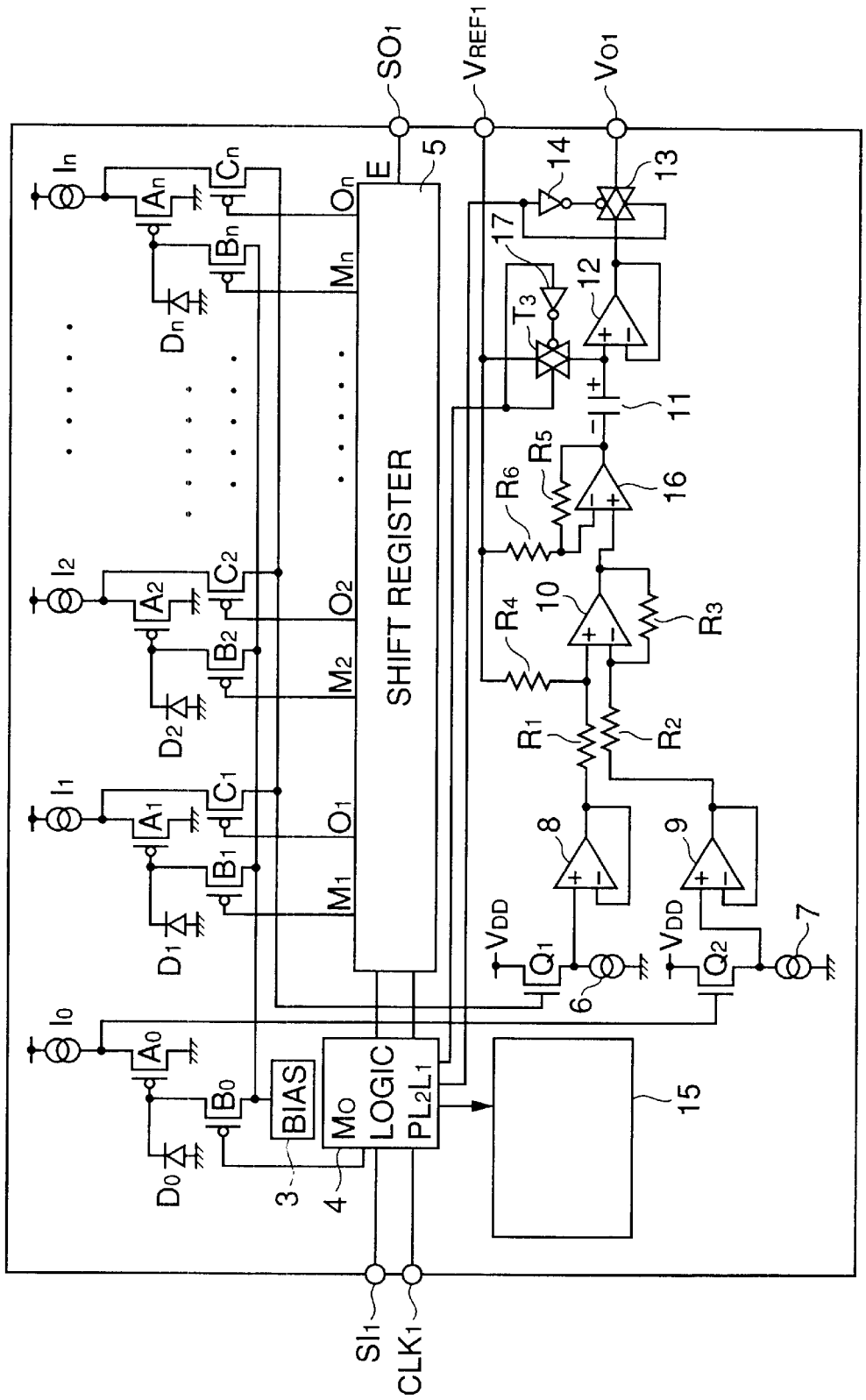
FIG. 16 is a circuit diagram of a ninth embodiment of the invention.

Next, FIG. 16 shows a ninth embodiment of the present invention. Here, as compared with the configuration shown in FIG. 2, an operational amplifier 16 is additionally provided in the stage succeeding the amplifier 10. The inverting input terminal (−) of the operational amplifier 16 is connected through a resistor $R_5$ to its own output terminal, and in addition, to the inverting input terminal (−) of the operational amplifier 16, a reference voltage fed in from the outside via the terminal $V_{REF1}$ is applied through a resistor $R_6$. The output terminal of the operational amplifier 16 is connected through a capacitor 11 to the input of the buffer amplifier 12 provided in the succeeding stage, and in addition, to the output terminal of the operational amplifier 16, a reference voltage fed in from the outside via a terminal $T_{REF}$ is applied through an analog witch T3. The signal output from the logic circuit 4 via its terminal $L_1$ is fed intact to the gate of the n-channel MOS transistor constituting the analog switch T3, and is fed through an inverter 17 to the gate of the p-channel MOS transistor constituting the analog switch T3. The analog switch T3 is turned on when the signal output from the logic circuit 4 via its terminal $L_1$ is at a high level, and is turned off when this signal is at a low level. The analog switch T3 is controlled by the logic circuit 4 in such a way as to be kept on for a predetermined period before the voltage of the first image-sensing photodiode $D_1$ is read out.

The output of the buffer amplifier 12 is, through the analog switch 13, fed out via the terminal $Vo_1$ of the IC chip. The signal output from the logic circuit 4 via its terminal $L_2$ is fed intact to the gate of the n-channel MOS transistor constituting the analog switch 13, and is fed through an inverter 14 to the gate of the p-channel MOS transistor constituting the analog switch 13. The analog switch 13 is kept on while the signal output from the logic circuit 4 via its terminal $L_2$ is at a high level, and is kept off while this signal is at a low level.

The analog switch 13 is controlled by the logic circuit 4 in such a way as to be kept on from immediately before the voltage of the photodiode $D_1$ is read out until the voltage of the last photodiode $D_n$ has been read out.

A constant-current source driving circuit 15 drives the individual constant-current sources $I_0, I_1, I_2, \ldots, I_n$, 6, and 7, and its operation is controlled by the logic circuit 4. Specifically, when the signal output from the logic circuit 4 via its terminal P is at a low level, the constant-current source driving circuit 15 is enabled, and, when this signal is at a high level, the constant-current source driving circuit 15 is disabled.

In this configuration, as long as the resistances of the resistors $R_1, R_2, R_3, R_4, R_5$, and $R_6$ are set appropriately, the difference between the voltage of one after another of the image-sensing photodiodes $D_1, D_2, \ldots, D_n$ and the voltage of the dummy photodiode $D_0$ is sequentially amplified and output. Thus, even if there are manufacture-attributable variations in the voltage level of the photodiodes among the IC chips, the levels of the outputs obtained from the individual IC chips are made uniform.

This is because the dummy photodiode $D_0$ is reset every half the period of the clock signal LCK, and therefore the voltage of the dummy photodiode $D_0$ is substantially nothing but the error component itself that is included in the voltage levels of the individual photodiodes due to variations in characteristics inevitable in manufacture. Thus, by calculating the differences between the voltages of the individual image-sensing photodiodes $D_1, D_2, \ldots, D_n$ and the voltage of the dummy photodiode $D_0$, it is possible to cancel the error components attributable to variations in characteristics inevitable in manufacture.

Figure 17:
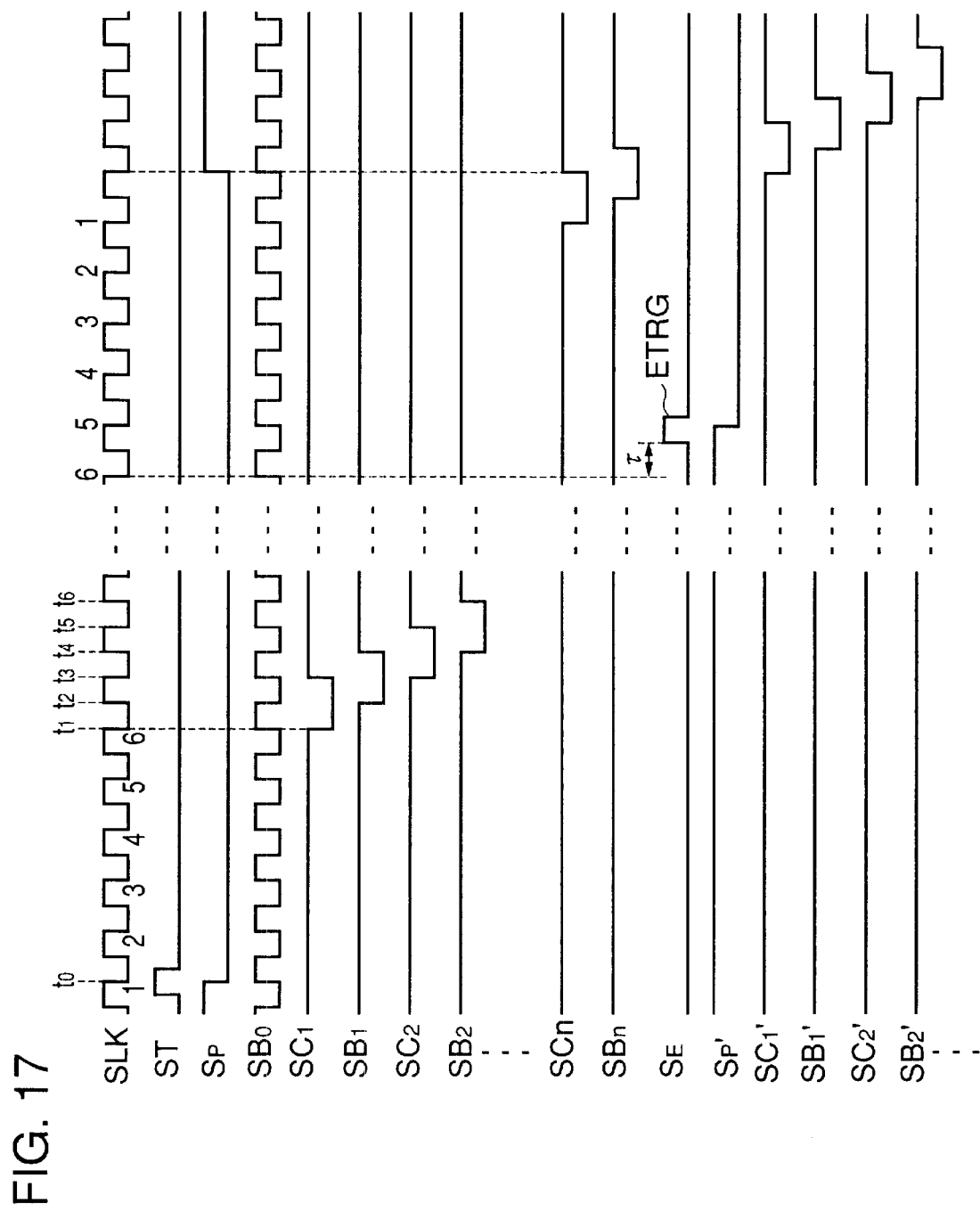
FIG. 17 is a time chart of the signals observed in various parts of the ninth embodiment.

If it is assumed that the clock signal and the start trigger signal are as indicated by SLK and ST in FIG. 17, then the signal output from the logic circuit 4 via its terminal $M_0$ is as indicated by $SB_0$ in FIG. 17. Thus, the transistor $B_0$ is kept off in the periods from $t_1$ to $t_2$, from $t_3$ to $t_4$, and from $t_5$ to $t_6$, and is kept on in the periods from $t_2$ to $t_3$ and from $t_4$ to $t_5$; that is, the transistor $B_0$ is switched between on and off every half the period of the clock CLK.

When the transistor $B_k$ (k=0, 1, 2, ..., n) is turned on, a reverse bias voltage is applied to the photodiode $D_k$, and thus a predetermined electric charge is accumulated therein. In the following descriptions, this will be described as "the photodiode $D_k$ being reset". When the photodiode $D_k$ recovers from the reset state, the accumulated electric charge is discharged according to the amount of incident light, causing a current to flow, and thus the photodiode $D_k$ exhibits a voltage that corresponds to the amount of incident light.

Moreover, as shown in FIG. 17, the logic circuit 4 shifts the signal $S_P$ it outputs via its terminal P from a high level to a low level at the first trailing edge of the clock signal CLK after the rising edge of the pulse of the start trigger signal ST. Thus, output operation is enabled at the time point $t_0$ in FIG. 17, i.e. a predetermined time before the voltage of the first image-sensing photodiode $D_1$ is read out.

Furthermore, as shown in FIG. 17, the logic circuit 4 shifts the signal $S_P$ it outputs via its terminal P to the constant-current source driving circuit 15 from a low level to a high level when the signal $SC_n$ output from the shift register 5 via its terminal $O_n$ turns from a low level to a high level (in other words, when the transistor $C_n$ is switched from on to off). Thus, output operation is disabled simultaneously when the voltage of the last image-sensing photodiode $D_n$ has been read out.

The start trigger signal and the clock signal are fed also through the logic circuit 4 to the shift register 5. After the rising edge of the start trigger signal, in synchronism with the trailing edges of the clock signal, the shift register 5 outputs a negative pulse having a pulse width corresponding to one period of the clock signal sequentially via one after another of the terminals $O_1, O_2, \ldots, O_n$. The number of pulses occurring in the clock signal is counted by the logic circuit 4 to permit the clock to be fed to the shift register 5 after a predetermined number of pulses (in this embodiment, six) have occurred.

Accordingly, the signals output via the terminals $O_1$, $O_2, \ldots, O_n$ are as indicated by $SC_1, SC_2, \ldots, SC_n$, respectively, in FIG. 17. Thus, in the period from $t_1$ to $t_3$, the transistor $C_1$ is kept on, then, in the period from $t_3$ to $t_5$, the transistor $C_2$ is kept on, and so forth; that is, one after another of the transistors $C_1, C_2, \ldots, C_n$ is sequentially kept on for a period corresponding to one period of the clock, and thereby the voltage of one after another of the image-sensing photodiodes $D_1, D_2, \ldots,$ Dn is sequentially fed to the gate of the transistor $Q_1$.

On the other hand, starting with the sixth rising edge of the clock signal after the first trailing edge thereof immediately after the rising edge of the start trigger signal, in synchronism with the rising edges of the clock signal, the shift register 5 outputs a negative pulse having a pulse width corresponding to one period of the clock signal via one after another of the terminals $M_1, M_2, \ldots, M_n$.

Accordingly, the signals output via the terminals $M_1$, $M_2, \ldots, M_n$ are as indicated by $SB_1, SB_2, \ldots, SB_n$, respectively, in FIG. 17. Thus, in the period from $t_2$ to $t_4$, the transistor $B_1$ is kept on, then, in the period from $t_4$ to $t_6$, the transistor $B_2$ is kept on, and so forth; that is, one after another of the transistors $B_1, B_2, \ldots, B_n$ is sequentially kept on for a period corresponding to one period of the clock, and thereby one after another of the photodiodes $D_1, D_2, \ldots,$ Dn is sequentially reset.

As a result, for example, the voltage of the photodiode $D_1$ is read out in the period from $t_1$ to $t_3$ in which the transistor $C_1$ is kept on, but, in the period from $t_2$ to $t_3$ (i.e. the latter half of the read-out period), the transistor $B_1$ is also kept on to reset the photodiode $D_1$, and therefore only the signal read out in the period from t, to $t_2$ (i.e. the first half of the read-out period) is valid. Similarly, also with the other image-sensing photodiodes $D_2, D_3, \ldots, D_n$, only the signal read out in the first half of the read-out period is valid.

Furthermore, before the completion of the reading of the last image-sensing photodiode $D_n$, the shift register 5 outputs an end trigger, which is a positive pulse, via its terminal E. Specifically, as indicated by $S_E$ in FIG. 17, the shift register 5 outputs the end trigger ETRG a predetermined period r shorter than one period of the clock CLK after sixth last trailing edge of the clock signal CLK before the signal $SC_n$ it outputs via its terminal $O_n$ turns from a low level to a high level.

The signal output from the shift register 5 via its terminal E is fed out via the terminal $SO_1$ of the IC chip so as to be fed to the terminal $SI_2$ of the next IC chip. That is, this signal is used as the start trigger signal by the next IC chip K2. Thus, in the next IC chip K2, the signal output from the logic circuit 4 via its terminal P and the signals output from the shift register 5 via its terminals $O_1, M_1, O_2, M_2, \ldots$ are as indicated by $S_P', SC_1', SB_1', SC_2', SB_2', \ldots$, and accordingly, also in this next IC chip, output operation is enabled a predetermined time before the signal from the first image-sensing photodiode $D_1$ is read out.

Moreover, in each of the IC chips constituting the image-sensing device of this embodiment, output operation is enabled from a predetermined period (the period from t0 to t1 corresponding to five periods of the clock signal LCK shown in FIG. 2) before the voltage from the first image-sensing photodiode D1 starts being read out until the signal from the last image-sensing photodiode Dn has been read out. As compared with cases where output operation is kept enabled all the time in each IC chip, this promotes reduction of power consumption.

As long as this predetermined period is set appropriately, the reading of voltages from the image-sensing photodiodes can be started well after the enabling of output operation, i.e. after a transient state has settled into a stable state. This ensures stable reading of signals in each chip, and thus stable reading of images.

In the image-sensing device of this embodiment, the IC chips are controlled so as to operate continuously (see FIG. 17). However, it is also possible to further delay the output timing of the next chip so that reading operation in this chip is started sufficiently late to exclude any influence of the completion of operation of the previous chip.

As described above, in this embodiment, in each IC chip, output operation is enabled a predetermined period before the photoelectric conversion signals start being read out, and output operation is disabled after the photoelectric conversion signals have been read out. Thus, by appropriately setting this predetermined period, it is possible to permit reading of the photoelectric conversion signals to be started well after the enabling of output operation, i.e. after a transient state has settled into a stable state. This ensures stable reading of images, and also promotes reduction of power consumption.

What is claimed is:

1. An image-sensing semiconductor device, comprising:
   a plurality of image-sensing photodiodes;
   a dummy photodiode;
   first bias means for feeding a bias to the dummy photodiode repeatedly with predetermined period;
   second bias means for feeding a bias to the plurality of photodiodes sequentially with a predetermined cycle;
   means for feeding output signals of the plurality of photodiodes sequentially to a first input terminal of a differential amplifier;
   means for feeding an output signal of the dummy photodiode to a second input terminal of the differential amplifier; and
   output means for feeding an output of the differential amplifier to an output terminal.

2. An image-sensing semiconductor device as claimed in claim 1;
   wherein the output means has means for eliminating a direct-current component from the output of the differential amplifier and means for superimposing a new direct-current voltage on the output of the differential amplifier after elimination of the direct-current component therefrom.

3. An image-sensing semiconductor device as claimed in claim 1, further comprising
   an output switch through which the output from the differential amplifier passes before reaching the output terminal;
   output control means for keeping the output switch in a conducting state until the output signals from all of the photodiodes have passed therethrough; and
   means for generating, in accordance with a clock, pulses to be used to feed the output signals of the photodiodes to the differential amplifier, wherein the output control means produces a passage control signal from the clock and has delay means for extending the passage control signal.

4. An image-sensing device having a plurality of semiconductor chips arranged as to form a line, the semiconductor chips each having a plurality of image-sensing photoelectric conversion devices arranged in a row, wherein the semiconductor chips each comprise:

a plurality of photodiodes;

a dummy photodiode;

first bias means for feeding a bias to the dummy photodiode repeatedly with a predetermined period;

second bias means for feeding a bias to the plurality of photodiodes sequentially with a predetermined cycle;

means for feeding output signals of the plurality of photodiodes sequentially to a first input terminal of a differential amplifier;

means for feeding an output signal of the dummy photodiode to a second input terminal of the differential amplifier; and output means for feeding an output of the differential amplifier to an output terminal;

wherein the semiconductor chips each have a dummy photoelectric conversion device and output a photoelectric conversion signal representing differences between an output of the dummy photoelectric conversion device and individual outputs of the image-sensing photoelectric devices.

5. An image-sensing semiconductor device as claimed in claim 4, wherein the output means has means for eliminating a direct-current component from the output of the differential amplifier and means for superimposing a new direct-current voltage on the output of the differential amplifier after elimination of the direct-current component therefrom.

6. An image-sensing semiconductor device as claimed in claim 4, further comprising an output switch through which the output from the differential amplifier passes before reaching the output terminal;

output control means for keeping the output switch in a conducting state until the output signals from all of the photodiodes have passed therethrough; and means for generating, in accordance with a clock, pulses to be used to feed the output signals of the photodiodes to the differential amplifier, wherein the output control means produces a passage control signal from the clock and has delay means for extending the passage control signal.

7. An image-sensing semiconductor device comprising:

a plurality of image-sensing photosensitive devices arranged in a line; a dummy photosensitive device;

switching transistors of a MOS type for sequentially extracting output signals of the plurality of photosensitive devices;

a dummy switching transistor that is turned off substantially simultaneously when a first of the plurality of switching transistors is turned on, and wherein the dummy switching transistor and dummy photosensitive device are arranged substantially at a center of the plurality of photosensitive devices.

8. An image-sensing semiconductor device, comprising:

a plurality of image-sensing photodiodes;

a dummy photodiode;

first bias means for feeding a bias to the dummy photodiode repeatedly with predetermined period;

second bias means for feeding a bias to the plurality of image-sensing photodiodes sequentially with a predetermined cycle;

a plurality of switching transistors for feeding output signals of the plurality of image-sensing photodiodes sequentially to a first input terminal of a differential amplifier;

means for feeding an output signal of the dummy photodiode to a second input terminal of the differential amplifier; and a dummy switching transistor having an output electrode connected to the first input terminal of the differential amplifier, the dummy switching transistor being controlled by a switching voltage applied to a control electrode thereof in such a way as to be turned off substantially simultaneously when the switching transistor corresponding to a first of the image-sensing photodiodes is turned on.

9. An image-sensing semiconductor device as claimed in claim 8, wherein the dummy switching transistor has an input terminal left open.

10. An image-sensing semiconductor device, comprising:

a plurality of image-sensing photodiodes;

a dummy photodiode;

first bias means for feeding a bias to the dummy photodiode repeatedly with a predetermined period;

second bias means for feeding a bias to the plurality of image-sensing photodiodes sequentially with a predetermined cycle;

a plurality of switching transistors for feeding output signals of the plurality of image-sensing photodiodes sequentially to a first input terminal of a differential amplifier;

means for feeding an output signal of the dummy photodiode to a second input terminal of the differential amplifier; and a dummy switching transistor having an input terminal connected so as to receive an output signal of the dummy photodiode and having an output electrode connected to the first input terminal of the differential amplifier, the dummy switching transistor being controlled by a switching voltage applied to a control electrode thereof in such a way as to be turned off substantially simultaneously when the switching transistor corresponding to a first of the image-sensing photodiodes is turned on.

11. An image-sensing device having a plurality of semiconductor chips arranged so as to form a line, the semiconductor chips each having a plurality of image-sensing photosensitive means, including a photoelectric conversion device, arranged in a row, wherein the semiconductor chips each have dummy photosensitive means provided at a center of the plurality of image-sensing photosensitive means arranged in a row, and output a photoelectric conversion signal representing differences between an output of the dummy photosensitive means and individual outputs of the plurality of image-sensing photosensitive means.

12. A semiconductor integrated circuit device having a plurality of image-sensing photosensitive means, including a photoelectric conversion device, arranged in a row, wherein the semiconductor integrated circuit device has a dummy photosensitive means provided at a center of the plurality of image-sensing photosensitive means arranged in a row, and outputs a photoelectric conversion signal representing differences between an output of the dummy photosensitive means and individual outputs of the plurality of image-sensing photosensitive means.

* * * * *